(12) United States Patent
Taffin

(10) Patent No.: US 7,987,034 B2
(45) Date of Patent: Jul. 26, 2011

(54) METHOD FOR CONTROLLING AUTOMATIC TRANSMISSION OF A VEHICLE ON A DOWNHILL SLOPE

(75) Inventor: Christian Taffin, Le Mesnil Saint Denis (FR)

(73) Assignee: Renault S.A.S., Boulogne Billancourt (FR)

( * ) Notice: Subject to any disclaimer, the term of this patent is extended or adjusted under 35 U.S.C. 154(b) by 943 days.

(21) Appl. No.: 10/534,982

(22) PCT Filed: Nov. 18, 2003

(86) PCT No.: PCT/FR03/03411
§ 371 (c)(1),
(2), (4) Date: Nov. 23, 2005

(87) PCT Pub. No.: WO2004/048818
PCT Pub. Date: Jun. 10, 2004

(65) Prior Publication Data
US 2006/0149450 A1    Jul. 6, 2006

(30) Foreign Application Priority Data
Nov. 21, 2002    (FR) .................................... 02 14560

(51) Int. Cl.
*B60T 8/32*    (2006.01)
(52) U.S. Cl. ................ 701/51; 701/58; 701/65; 701/70; 701/93; 701/95; 701/98; 73/1.75
(58) Field of Classification Search ............. 701/51–56, 701/87, 93–96; 180/336, 337
See application file for complete search history.

(56) References Cited

U.S. PATENT DOCUMENTS

| | | | | |
|---|---|---|---|---|
| 4,039,061 A | * | 8/1977 | Pruvot et al. | 192/220 |
| 4,564,906 A | * | 1/1986 | Stephan et al. | 701/65 |
| 4,648,291 A | * | 3/1987 | Klatt et al. | 477/119 |
| 4,933,859 A | * | 6/1990 | Tsuyama et al. | 701/93 |
| 5,010,490 A | * | 4/1991 | Naito et al. | 701/95 |
| 5,021,958 A | * | 6/1991 | Tokoro | 701/98 |
| 5,123,301 A | * | 6/1992 | Hagele et al. | 477/121 |
| 5,129,475 A | * | 7/1992 | Kawano et al. | 180/179 |
| 5,148,721 A | * | 9/1992 | Anan et al. | 701/53 |
| 5,154,250 A | * | 10/1992 | Murai | 180/179 |
| 5,329,454 A | * | 7/1994 | Takada et al. | 701/95 |
| 5,479,349 A | * | 12/1995 | Katayama | 701/93 |
| 5,485,161 A | * | 1/1996 | Vaughn | 342/357.13 |
| 5,526,261 A | * | 6/1996 | Kallis et al. | 701/51 |
| 5,557,519 A | * | 9/1996 | Morita | 701/1 |
| 5,749,804 A | * | 5/1998 | Toukura | 477/47 |

(Continued)

FOREIGN PATENT DOCUMENTS
EP    0 314 067    5/1989
(Continued)

*Primary Examiner* — Jack Keith
*Assistant Examiner* — Jonathan M Dager
(74) *Attorney, Agent, or Firm* — Oblon, Spivak, McClelland, Maier & Neustadt, L.L.P.

(57) ABSTRACT

The invention concerns a method for controlling automatic transmission (3) of a vehicle comprising an engine (2) driving the transmission (3) which consists in: detecting a downhill situation of the vehicle, and selecting a transmission ratio so that the engine absorbs energy, storing a longitudinal speed of downhill start (Vmin) when the vehicle starts going downhill, and while the vehicle is running downhill, comparing the current speed (V) of the vehicle with the downhill start speed (Vmin) such that the current speed (V) exceeds the downhill start speed (Vmin) by a predetermined difference (VS), then controlling the transmission to trigger downshifting.

14 Claims, 2 Drawing Sheets

U.S. PATENT DOCUMENTS

| | | | |
|---|---|---|---|
| 5,758,306 A * | 5/1998 | Nakamura | 701/93 |
| 5,765,117 A * | 6/1998 | Horiguchi | 701/51 |
| 5,794,170 A * | 8/1998 | Kuroda et al. | 701/93 |
| 5,832,400 A * | 11/1998 | Takahashi et al. | 701/53 |
| 5,839,534 A * | 11/1998 | Chakraborty et al. | 180/169 |
| 5,847,644 A * | 12/1998 | Weisman et al. | 340/439 |
| 5,902,345 A * | 5/1999 | Minowa et al. | 701/96 |
| 5,944,766 A * | 8/1999 | White | 701/94 |
| 6,029,107 A * | 2/2000 | Sato | 701/58 |
| 6,032,098 A * | 2/2000 | Takahashi et al. | 701/210 |
| 6,135,918 A * | 10/2000 | Bellinger et al. | 477/111 |
| 6,169,949 B1 * | 1/2001 | Sato | 701/51 |
| 6,182,000 B1 * | 1/2001 | Ohta et al. | 701/55 |
| 6,216,081 B1 * | 4/2001 | Tabata et al. | 701/87 |
| 6,266,604 B1 * | 7/2001 | Linden | 701/93 |
| 6,304,810 B1 * | 10/2001 | Westerberg | 701/93 |
| 6,311,118 B1 * | 10/2001 | Ito et al. | 701/95 |
| 6,330,873 B1 * | 12/2001 | Letang et al. | 123/322 |
| 6,360,155 B1 * | 3/2002 | Taffin et al. | 701/57 |
| 6,389,347 B1 * | 5/2002 | Nozaki | 701/54 |
| 6,405,115 B2 * | 6/2002 | Taniguchi et al. | 701/51 |
| 6,405,119 B1 * | 6/2002 | Linden | 701/95 |
| 6,427,108 B1 * | 7/2002 | Kanasugi et al. | 701/51 |
| 6,459,977 B1 * | 10/2002 | Taffin et al. | 701/51 |
| 6,484,086 B2 * | 11/2002 | Jeon | 701/93 |
| 6,547,697 B1 * | 4/2003 | Taffin et al. | 477/109 |
| 6,569,052 B2 * | 5/2003 | Sakai et al. | 475/214 |
| 6,837,323 B2 * | 1/2005 | Denton et al. | 180/65.4 |
| 7,146,264 B2 * | 12/2006 | Bates et al. | 701/59 |
| 2001/0016795 A1 * | 8/2001 | Bellinger | 701/53 |
| 2001/0044686 A1 * | 11/2001 | Taniguchi et al. | 701/51 |
| 2002/0026274 A1 * | 2/2002 | Morizane et al. | 701/93 |
| 2002/0082764 A1 | 6/2002 | Ikeda | |
| 2002/0087253 A1 * | 7/2002 | Jeon | 701/93 |
| 2002/0095255 A1 * | 7/2002 | Minowa et al. | 701/96 |
| 2002/0107106 A1 * | 8/2002 | Kato et al. | 477/110 |
| 2002/0124581 A1 * | 9/2002 | Kotwicki et al. | 62/133 |
| 2002/0138190 A1 * | 9/2002 | Hellmann et al. | 701/78 |
| 2002/0161506 A1 * | 10/2002 | Ishizu et al. | 701/96 |
| 2003/0062206 A1 * | 4/2003 | Fujikawa | 180/65.2 |
| 2003/0074124 A1 * | 4/2003 | Ono et al. | 701/70 |
| 2003/0130779 A1 * | 7/2003 | Shiimado et al. | 701/65 |
| 2003/0139868 A1 * | 7/2003 | Henneken et al. | 701/51 |
| 2004/0002806 A1 * | 1/2004 | Bellinger | 701/104 |
| 2004/0084237 A1 * | 5/2004 | Petrie, Jr. | 180/170 |
| 2007/0106448 A1 * | 5/2007 | Minowa et al. | 701/96 |
| 2009/0126656 A1 * | 5/2009 | Mounetou et al. | 123/41.1 |

FOREIGN PATENT DOCUMENTS

| | | |
|---|---|---|
| EP | 0 972 971 | 1/2000 |
| EP | 1 041 314 | 10/2000 |

* cited by examiner

METHOD FOR CONTROLLING AUTOMATIC TRANSMISSION OF A VEHICLE ON A DOWNHILL SLOPE

BACKGROUND OF THE INVENTION

I. Field of the Invention

The invention relates to a method for control of an automatic transmission of a vehicle in a downhill-travel situation.

II. Description of Related Art

Vehicles equipped with automatic transmission, particularly hydraulically controlled transmission, have long suffered from a deficiency that becomes evident during downhill-travel situations. In fact, when the driver takes his foot off the accelerator, the vehicle adopts the longest transmission ratio or disengages every transmission ratio. As a result, the vehicle cannot benefit from the braking effect of the engine in a downhill-travel situation in order to govern the speed of the vehicle.

To remedy this shortcoming, there was proposed in European Patent 1041314 a method for control of an automatic transmission wherein the slope on which the vehicle is traveling is detected, in which case a specific rule for control of the vehicle is adopted. This rule, stored in memory in the form of a map, modifies the choice of transmission ratios in order to achieve the braking effect of the engine. It establishes a correspondence among the speed of the vehicle, the power demanded and the transmission ratio.

However, this transitional rule is adapted only to a medium downhill-travel situation. In the case of a steep slope, where the braking effect of the engine would have to be very strong, the ratio chosen is generally too long to achieve the braking effect of the engine. Similarly, in the case of a very gentle slope, the braking effect of the engine is too great and the vehicle slows down.

BRIEF SUMMARY OF THE INVENTION

It is therefore one objective of the invention to provide, for control of an automatic transmission of a vehicle, a method that adapts to all downhill-travel situations in which the vehicle may find itself.

With this objective in view, the object of the invention is a method for control of an automatic transmission of a vehicle provided with an engine that drives the transmission, in which method a downhill-travel situation of the vehicle is detected and a transmission ratio is chosen such that the engine absorbs energy, characterized in that the longitudinal speed at the beginning of downhill travel is stored in memory when the vehicle begins a downhill-travel situation and, as long as the vehicle is in the downhill-travel situation, the current speed of the vehicle is compared with the speed at the beginning of downhill travel in such a way that, if the current speed exceeds the speed at the beginning of downhill travel by a predetermined deviation, the transmission is then instructed to initiate downshifting.

Thus, by virtue of the invention, the transmission ratio is chosen not according to a general rule but explicitly as a function of the vehicle situation, by initiating downshifting after analysis of this situation. In fact, the need for downshifting appears when the vehicle in the downhill-travel situation accelerates and substantially exceeds the speed at the beginning of downhill travel.

In one particular embodiment, the vehicle is equipped with a system for governing the speed.

Preferably, the downhill-travel situation is detected if the slope is greater than a predetermined threshold slope, if the power demand of the engine is smaller than a predetermined power threshold, and braking is absent. The presence of braking corresponds normally to the driver's intent to slow or even stop the vehicle, and therefore does not correspond to the situation constituting the object of the invention. The downhill-travel situation therefore corresponds to the presence of a slope on which the vehicle is traveling and to the intent of the driver to not accelerate, as indicated by a power demand below a threshold. This power demand can be evaluated by the position of the accelerator pedal, for example by the completely released position of the pedal. In the case of a vehicle equipped with a speed-governing system, the power demand is measured within the engine controller, using an equivalent of the position of the accelerator pedal. This can be the position of the butterfly valve in the case of a controlled-ignition engine, or the quantity of fuel injected in the case of a diesel engine or a setpoint of the torque to be delivered by the engine.

Preferably, the method includes an additional test step verifying that, before downshifting is initiated, the energy-absorption capacity of the engine is smaller than a predetermined power threshold. Before initiating downshifting, the method verifies that the engine is not in a situation in which it can absorb energy sufficiently. Thus downshifting is initiated only if the excess speed is due to the incapacity of the engine to hold the vehicle back. If downshifting has been initiated previously, further downshifting is avoided by allowing the vehicle time to slow and to approach the speed at the beginning of downhill travel.

In a particular manner, the absorption capacity of the engine is determined by the engine speed. In fact, it is easy to relate the power absorption capacity of the engine to its speed of revolution when the power demanded is zero (butterfly valve closed or no fuel being injected).

Advantageously, the threshold of power absorption capacity is an increasing function of the slope. The greater the slope, the higher is the predetermined power threshold that leads to downshifting as soon as the braking effect of the engine is no longer sufficient to prevent runaway acceleration of the vehicle. In the case in which the absorption capacity is determined by the engine speed, downshifting will be initiated for an engine speed threshold that increases as a function of slope. As an example, for a controlled ignition engine, the predetermined threshold is substantially 1800 to 2000 rpm for a slope of less than 5%, 2500 to 3000 rpm for a slope of 5 to 10% and 3500 to 4000 rpm for a slope of greater than 10%. These thresholds are lower in the case of a diesel engine.

As regards the deviation from predetermined speed, it is preferably between 5 and 10 km/h. The deviation from predetermined speed is in the low range on the whole in the case of a vehicle equipped with a speed governor, and otherwise is in the high range on the whole. The deviation from predetermined speed can also depend on the current transmission ratio.

The invention also has as an object a system for control of an automatic transmission of a vehicle provided with an engine that drives the transmission, the system being provided with means for identifying a downhill-travel situation of the vehicle and with means for choosing a transmission ratio so that the engine absorbs energy, characterized in that it is additionally provided with means for measuring and storing in memory the longitudinal speed at the beginning of downhill travel, measuring the said speed and storing it in memory when the vehicle begins a downhill-travel situation, means for comparing the current speed of the vehicle with the speed at the beginning of downhill travel, and means for instructing the transmission to initiate downshifting if the current speed exceeds the speed, stored in memory, at the beginning of downhill travel by a predetermined deviation.

The invention also has as an object a vehicle provided with an engine and an automatic transmission, characterized in that it is provided with the foregoing control system.

BRIEF DESCRIPTION OF THE DRAWINGS

The invention will be better understood and other features and advantages will become apparent upon reading the description presented hereinafter, the description referring to the attached drawings, wherein.

DETAILED DESCRIPTION OF THE INVENTION

Figure 1:
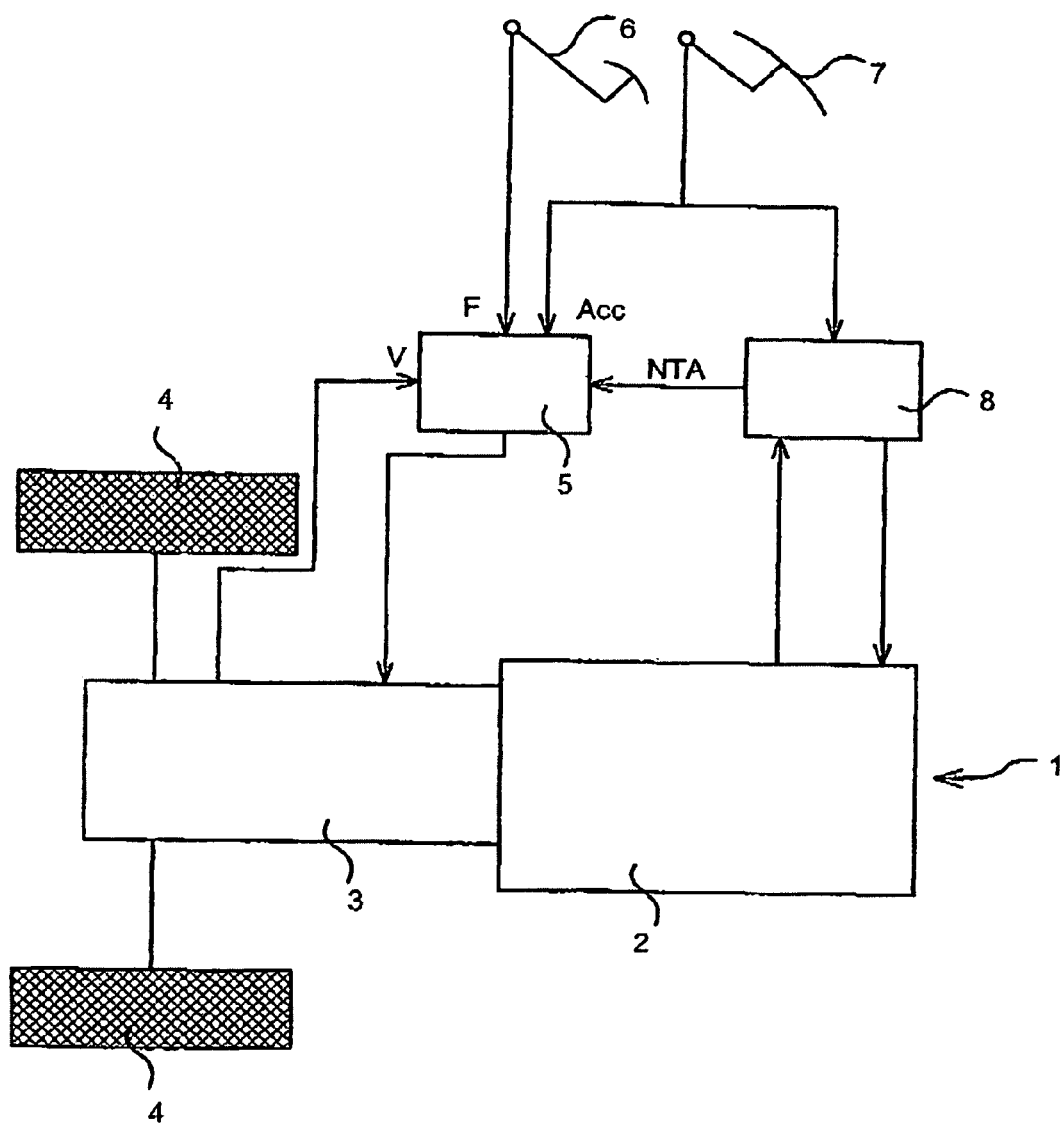
FIG. 1 is a schematic view of a motive power group using a method according to the invention.

A vehicle in which the method according to the invention is used is provided with a motive power group 1 composed of an engine 2 and an automatic transmission 3. Engine 2 is, for example, an internal combustion engine of the diesel or controlled ignition type that delivers power to transmission 3 then to wheels 4. Transmission 3 is, for example, an automatic gearbox with epicycloids trains, a robotic gearbox or a pulley-type speed variator. An electronic control unit 5 makes it possible to control transmission 3 either by directly determining the transmission ratio to be used or by interfering with an autonomous control system of transmission 3, such as a hydraulic system.

Electronic unit 5 utilizes the method according to the invention, for example in the form of an information-processing program. It receives information on the state of the vehicle, in particular the position F of a brake pedal 6, the position Acc of an accelerator pedal 7, the speed V of the vehicle, the engine speed NTA and information useful for determining the slope P, or possibly direct information about the slope P. The engine speed NTA is transmitted, for example, by an engine controller 8.

Figure 2:
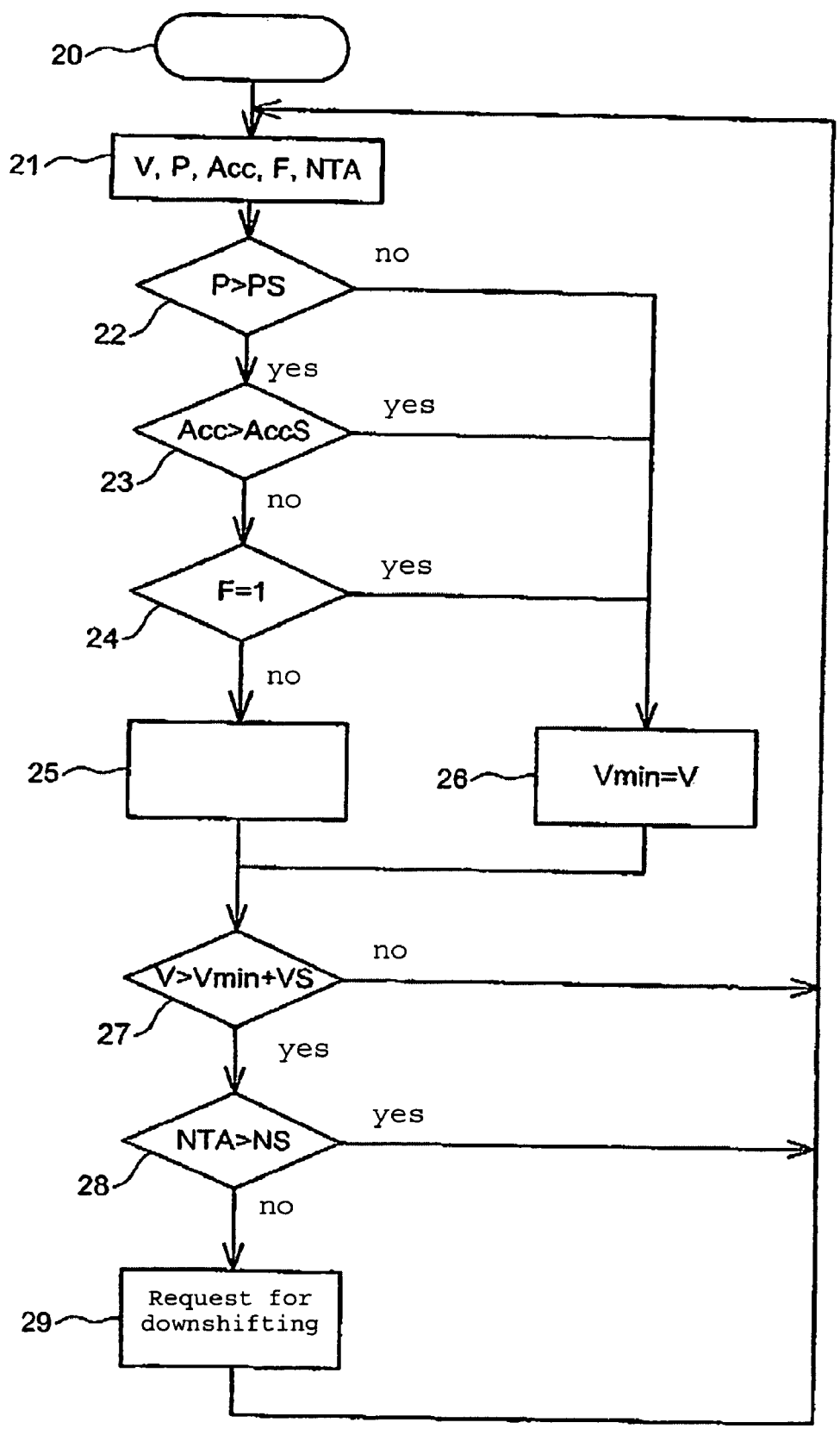
FIG. 2 is a flow chart of the method according to the invention.

Referring to FIG. 2, after undergoing an initialization stage 20, the unit acquires the aforesaid data V, P, Acc, F and NTA in step 21. In test step 22, the slope P is compared with a predetermined threshold slope PS. If the slope P is greater than the threshold slope PS, it is decided that the vehicle is traveling on a downhill slope, and test step 23 is undertaken. Otherwise step 26 is undertaken.

In test step 23, the accelerator position Acc is compared with a predetermined power threshold, expressed in the form of a position threshold AccS of the accelerator. If the position Acc exceeds the threshold position AccS, step 26 is undertaken. Otherwise it is decided that the accelerator pedal is released and test step 24 is undertaken, in which the position of the brake pedal is checked. If the brakes have been activated, the position F is then equal to 1, and step 26 is undertaken. Otherwise step 25 is undertaken.

Step 25 is reached when the vehicle is in a downhill-travel situation in which the speed Vmin at the beginning of downhill travel is maintained. In contrast, in step 26, when the vehicle is not in a downhill-travel situation, the variable Vmin is updated with the current speed V of the vehicle.

At the end of one or other of these steps 25, 26, test step 27 is executed. In this step 27, the speed V is compared with the speed Vmin at the beginning of downhill travel. If the speed V is not higher than the speed Vmin at the beginning of downhill travel plus a speed deviation VS, this deviation being positive, then execution of the program is returned to step 21. This situation corresponds to a case in which the vehicle speed is not too different from the speed Vmin at the beginning of downhill travel. This is the case in particular when step 26 has just been executed, because the stated condition is always verified. In the opposite case, or in other words if the speed V is higher than the speed Vmin at the beginning of downhill travel plus a speed deviation VS, then test step 28 is executed.

During test step 28, the speed NTA of revolution of the engine is compared with a threshold speed NS. If the speed NTA is greater than the threshold speed NS, then the engine is already revolving rapidly and absorbing a power greater than the predetermined power threshold and corresponding to the speed NS of revolution. Downshifting is not authorized and execution of the program is returned to step 21. In the opposite case, step 29 is executed, whereby a downshift instruction is sent to the transmission to shorten the transmission ratio. For a transmission with continuously variable ratio, the downshift request can take the form of a request to increase the gearbox input speed. Execution of the program is then returned to step 21. As indicated hereinabove in the description of the invention, the threshold NS is a function of the slope.

Evaluation of the slope P can be achieved by a method such as disclosed, for example, in European Patent 1041314. According to this method, a calculated acceleration $\gamma c$ is evaluated and compared with the real acceleration $\gamma m$. The evaluation of the calculated acceleration uses the formula:

$$\gamma c = \mathrm{rap}(N) \cdot C_{moteur} / \mathrm{Rayon} \cdot \mathrm{Masse} - \tfrac{1}{2}\rho \cdot Scx \cdot V_{veh} / \mathrm{Masse} \cdot g \cdot kr,$$

In this expression:
rap(N) is the gear reduction ratio relative to the wheel over the ratio (N),
$C_{moteur}$ is the engine torque determined by the engine control unit as a function, for example, of the position of the accelerator pedal and of the engine speed,
Rayon is the wheel radius,
Masse is the empty mass of the vehicle with two persons on board,
$\rho$ is the density of the air,
Scx is the coefficient of penetration of the vehicle through the air,
g is the acceleration of gravity (g=9.81 m/s2), and
kr is the resistance to rolling.

The slope P being traveled by the vehicle (positive in the case of downhill travel) is then calculated according to the following formula:

$$P = (\gamma m - \gamma c)/g$$

The evaluation is performed by unit 5 on the basis of information received, or by another vehicle system that transmits the value of P directly to unit 5. The information received originates, for example, from sensors that are not illustrated, from engine controller 8 or from another vehicle system, possibly via an on-board digital network. European Patent 1106872 also discloses the same method. Other methods of evaluation of the slope may be used.

The invention claimed is:
1. A method for control of an automatic transmission of a vehicle provided with an engine that drives the transmission, comprising:
detecting a downhill-travel situation of the vehicle via an electronic unit when a slope on which the vehicle is traveling is greater than a predetermined threshold slope, a power demand of the engine is smaller than a predetermined power threshold, and braking via a brake pedal is absent;

when the electronic unit detects the downhill-travel situation, storing a longitudinal speed at a beginning of the downhill-travel situation in a memory;

during the downhill-travel situation, comparing a current speed of the vehicle with the speed at the beginning of the downhill-travel situation;

based on the comparing, choosing a transmission ratio such that the engine absorbs energy, comprising instructing the transmission to initiate downshifting if the current speed exceeds the speed at the beginning of the downhill-travel situation by an excess speed that is above a predetermined deviation such that the downshifting is initiated only if the excess speed is due to an incapacity of the engine to hold the vehicle below the excess speed; and when the electronic unit does not detect the downhill-travel situation because the slope on which the vehicle is traveling is not greater than the predetermined threshold slope, updating a variable speed of the vehicle stored in the memory with the current speed of the vehicle, wherein when the braking is applied via the brake pedal, the downhill-travel situation is not detected.

2. A control method according to claim 1, further comprising:
verifying that, before the downshifting is initiated, an energy-absorption capacity of the engine is smaller than the predetermined power threshold.

3. A control method according to claim 2, wherein the energy-absorption capacity of the engine is determined by an engine speed.

4. A control method according to claim 2, wherein the predetermined power threshold is an increasing function of the slope on which the vehicle is traveling.

5. A control method according to claim 1, wherein the deviation from the speed at the beginning of the downhill-travel situation is between 5 and 10 km/h.

6. A control method according to claim 1, wherein the vehicle is equipped with a speed-governing system.

7. A system for control of an automatic transmission of a vehicle provided with an engine that drives the transmission, comprising:
an electronic unit configured to:
identify a downhill-travel situation of the vehicle when a slope on which the vehicle is traveling is greater than a predetermined threshold slope, a power demand of the engine is smaller than a predetermined power threshold, and braking via a brake pedal is absent,
when the electronic unit identifies the down-hill travel situation, measure and store in a memory a longitudinal speed at a beginning of the downhill-travel situation,
compare a current speed of the vehicle with the speed at the beginning of the downhill-travel situation,
instruct the transmission to initiate downshifting if the current speed exceeds the speed at the beginning of the downhill-travel situation by an excess speed that is above a predetermined deviation such that the downshifting is initiated only if the excess speed is due to an incapacity of the engine to hold the vehicle below the excess speed, and update a variable speed of the vehicle stored in the memory with the current speed of the vehicle when the downhill-travel situation is not detected because the slope on which the vehicle is traveling is not greater than the predetermined threshold slope,
wherein the electronic unit does not identify the downhill-travel situation if the braking is applied via the brake pedal.

8. A vehicle, comprising:
an engine;
an automatic transmission driven by the engine; and
a system to control the automatic transmission, the system comprising an electronic unit configured to:
identify a downhill-travel situation of the vehicle when a slope on which the vehicle is traveling is greater than a predetermined threshold slope, a power demand of the engine is smaller than a predetermined power threshold, and braking via a brake pedal is absent,
when the electronic unit identifies the down-hill travel situation, measure and store in a memory a longitudinal speed at a beginning of the downhill-travel situation,
compare a current speed of the vehicle with the speed at the beginning of the downhill-travel situation,
instruct the transmission to initiate downshifting if the current speed exceeds the speed at the beginning of the downhill-travel situation by an excess speed that is above a predetermined deviation such that the downshifting is initiated only if the excess speed is due to an incapacity of the engine to hold the vehicle below the excess speed,
update a variable speed of the vehicle stored in the memory with the current speed of the vehicle when the downhill-travel situation is not detected because the slope on which the vehicle is traveling is not greater than the predetermined threshold slope,
wherein the electronic unit does not identify the downhill-travel situation if the braking is applied via the brake pedal.

9. A control method according to claim 1, wherein the downhill-travel situation is not detected if an accelerator pedal is depressed such that the power demand of the engine is larger than the predetermined power threshold.

10. A system according to claim 7, wherein the electronic unit is configured to verify that, before the downshifting is initiated, an energy-absorption capacity of the engine is smaller than the predetermined power threshold.

11. A system according to claim 10, wherein the energy-absorption capacity of the engine is determined by an engine speed.

12. A system according to claim 11, further comprising:
an engine controller configured to measure the engine speed.

13. A system according to claim 10, wherein the predetermined power threshold is an increasing function of the slope on which the vehicle is traveling.

14. A system according to claim 7, wherein the electronic unit does not detect the downhill-travel situation if the power demand of the engine from an accelerator pedal being depressed is larger than the predetermined power threshold.

* * * * *